United States Patent [19]

Layton et al.

[11] Patent Number: 5,039,221

[45] Date of Patent: Aug. 13, 1991

[54] INTERFEROMETER CALIBRATION FOR FIBER OPTIC SENSOR ARRAYS

[75] Inventors: Michael R. Layton, Clayton; James S. Bunn, Jr., Malibu, both of Calif.

[73] Assignee: Litton Systems, Inc., Beverly Hills, Calif.

[21] Appl. No.: 375,323

[22] Filed: Jul. 3, 1989

[51] Int. Cl.$^5$ .............................................. G01B 9/02
[52] U.S. Cl. ................................ 356/345; 250/227.19
[58] Field of Search ................. 356/345; 250/227.19, 250/227.27; 367/149, 155; 73/655

[56] References Cited

U.S. PATENT DOCUMENTS

| | | |
|---|---|---|
| 4,294,513 | 10/1981 | Nelson et al. . |
| 4,307,933 | 12/1981 | Palmer et al. . |
| 4,368,981 | 1/1983 | Ozeki . |
| 4,493,528 | 1/1985 | Shaw et al. . |
| 4,525,818 | 6/1985 | Cielo et al. . |
| 4,530,603 | 7/1985 | Shaw et al. . |
| 4,545,253 | 10/1985 | Avicola . |
| 4,632,551 | 12/1986 | Pavlath . |
| 4,648,083 | 3/1987 | Giallorenzi . |
| 4,697,926 | 10/1987 | Youngquist et al. ............... 356/345 |
| 4,753,529 | 6/1988 | Layton . |
| 4,775,216 | 10/1988 | Layton ............................ 350/96.29 |
| 4,848,906 | 7/1989 | Layton ............................... 356/345 |
| 4,889,986 | 12/1989 | Keasey et al. ...................... 356/345 |

FOREIGN PATENT DOCUMENTS

| | | |
|---|---|---|
| 0101078 | 2/1984 | European Pat. Off. . |
| 0206577 | 6/1986 | European Pat. Off. . |
| 58-211119 | 6/1982 | Japan . |
| WO79/00377 | 12/1978 | PCT Int'l Appl. . |
| 2096762 | 4/1981 | United Kingdom . |

OTHER PUBLICATIONS

Sheem et al., "Wavelength Monitoring of Single-Mode Diode Laser Using Guided-Wave Interferometer", Optics Letters, May 1980, vol. 5, No. 5, pp. 179-181.

Schwaier et al., "Lichtwellenleiter in der ProzeBmeBtechnik", Automatisierungstechnische, vol. 27, No. 12, 1985, pp. 574-578.

Dandridge et al., "Homodyne Demodulation Scheme for Fiber Optic Sensors Using Phase Generated Carrier", IEEE Journal of Quantum Electronics, vol. QE-18, No. 10, Oct., 1982, pp. 1647-1652.

Brooks et al., "Fiber-Optic Interferometric Sensor Arrays with Freedom from Source Phase-Induced Noise", Optics Letters, Jul. 1986, vol. 11, No. 7, pp. 473-475.

Dandridge et al., "Phase Compensation in Interferometric Fiber-Optic Sensors", Optics Letters, Jun. 1982, vol. 7, No. 6, pp. 279-281.

Primary Examiner—Samuel Turner
Attorney, Agent, or Firm—Lynn & Lynn

[57] ABSTRACT

A switch-selectable calibration signal is applied to an interferometric sensor channel of fiber optic sensor array for monitoring its operation. A calibration signal is applied at a single physical location to determine the channel scale factors and proper operability of multiple sensors at remote locations in the array. An optical signal input to each interferometric sensor channel in the array, and a compensating interferometer receives optical signals output from the fiber optic sensor array. A signal is applied to the compensating interferometer to form an output signal that simulates signals output from each interferometric sensor in the array. These signals are processed to determine the scale factor of each interferometer in the fiber optic sensor array.

26 Claims, 9 Drawing Sheets

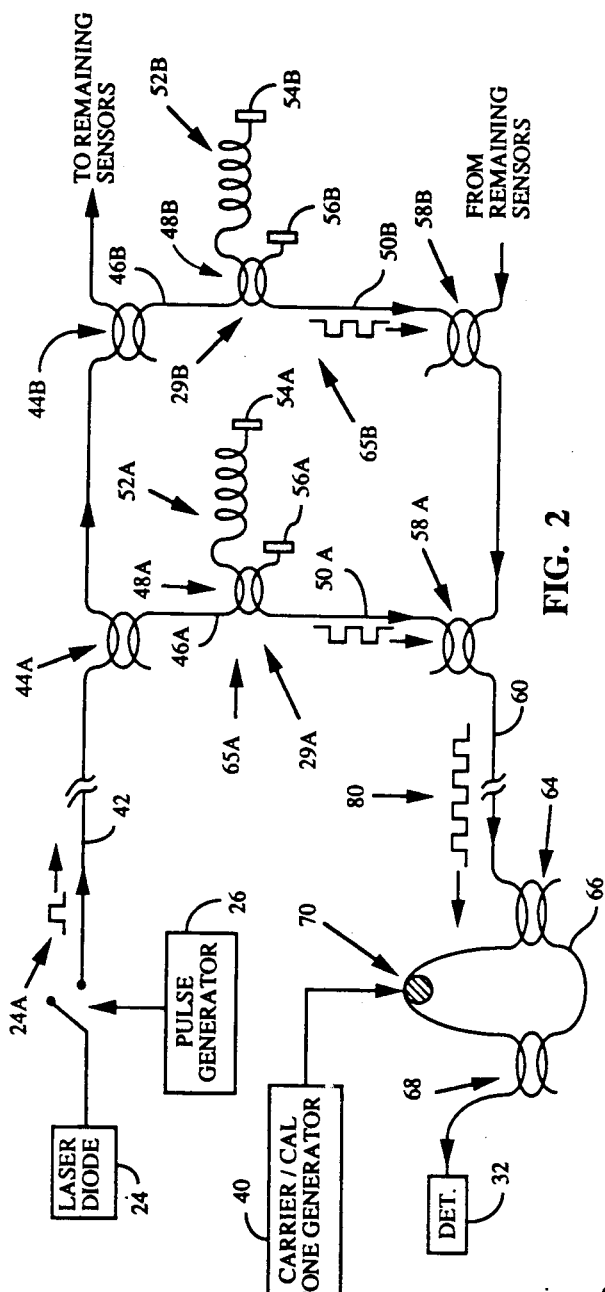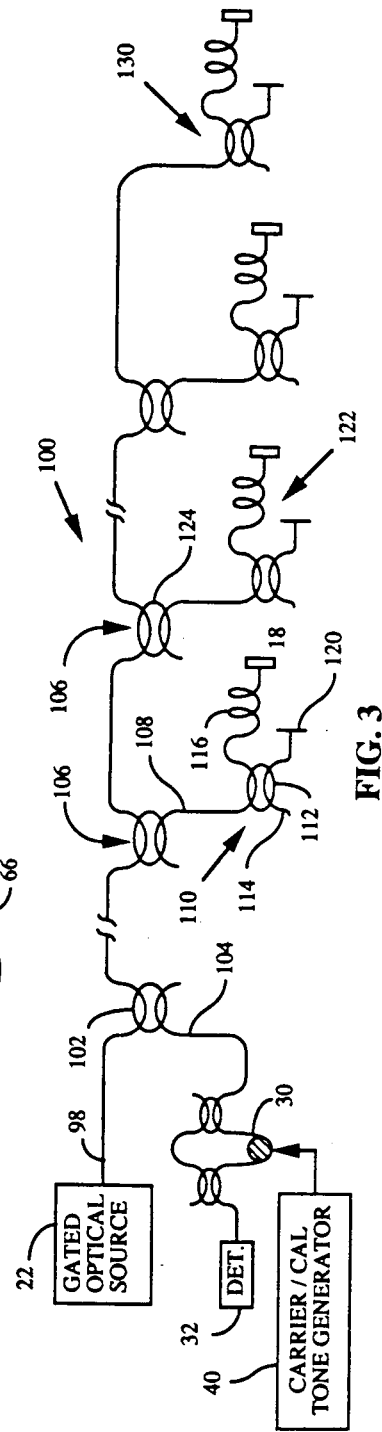
FIG. 2
FIG. 3

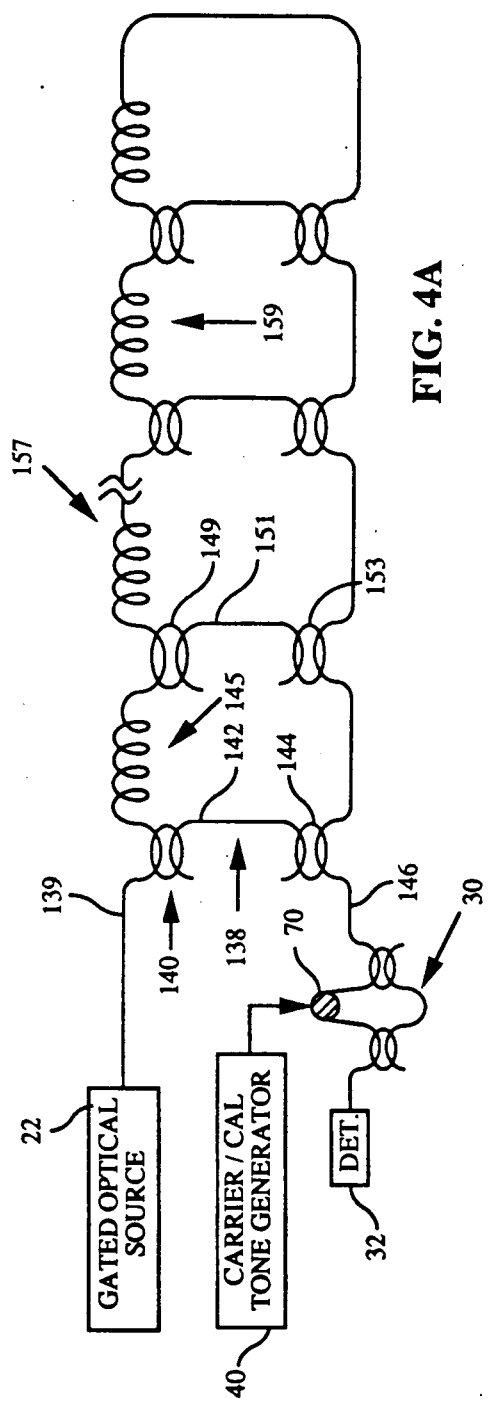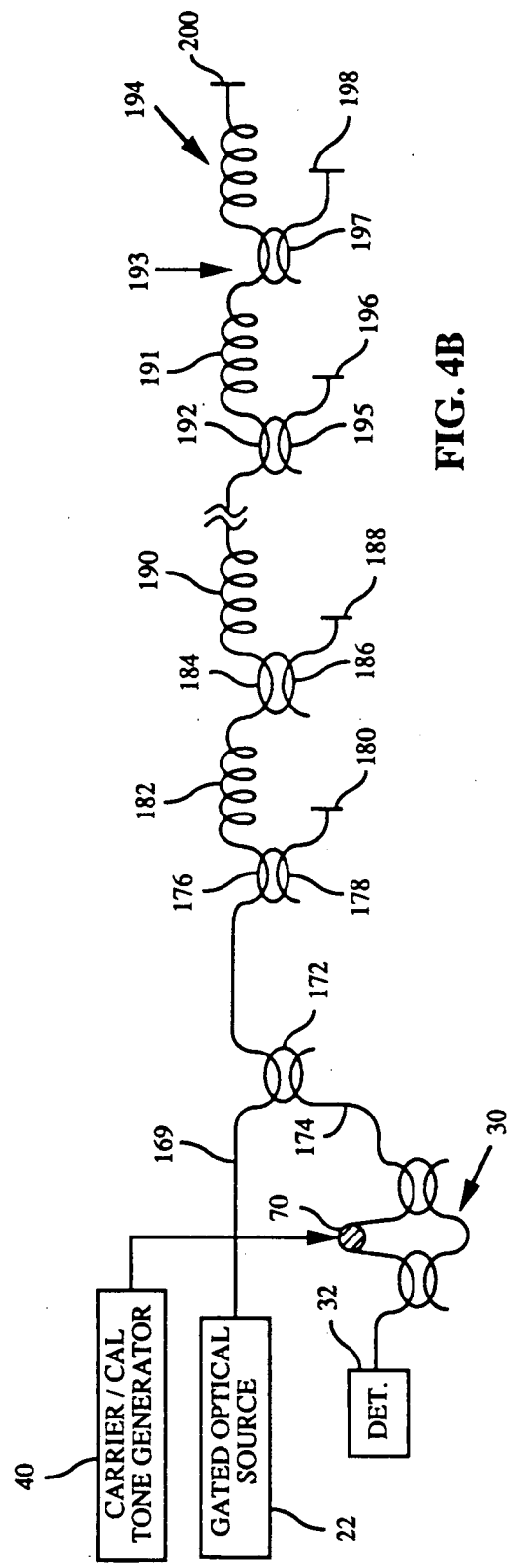

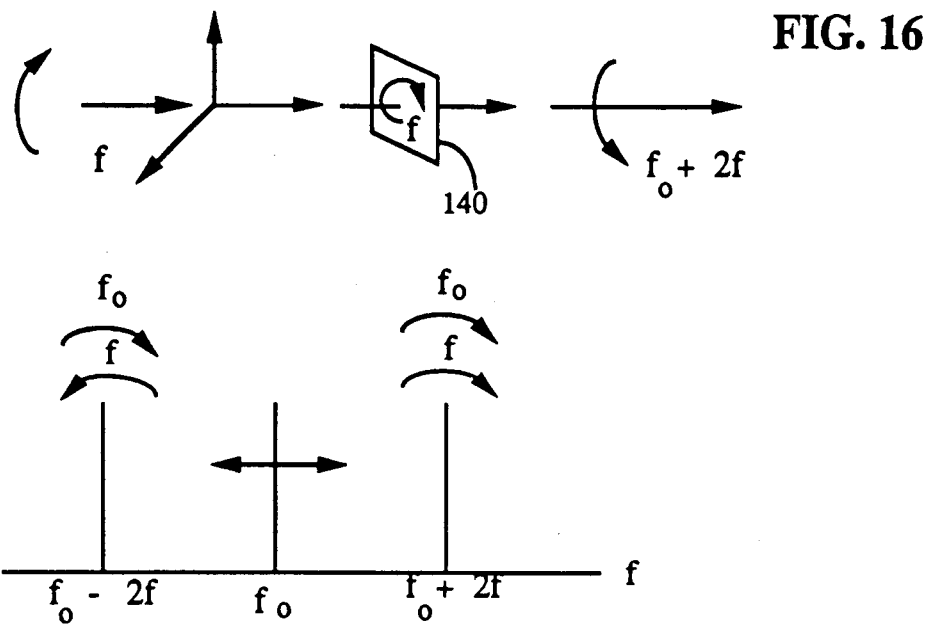
FIG. 16
FIG. 17
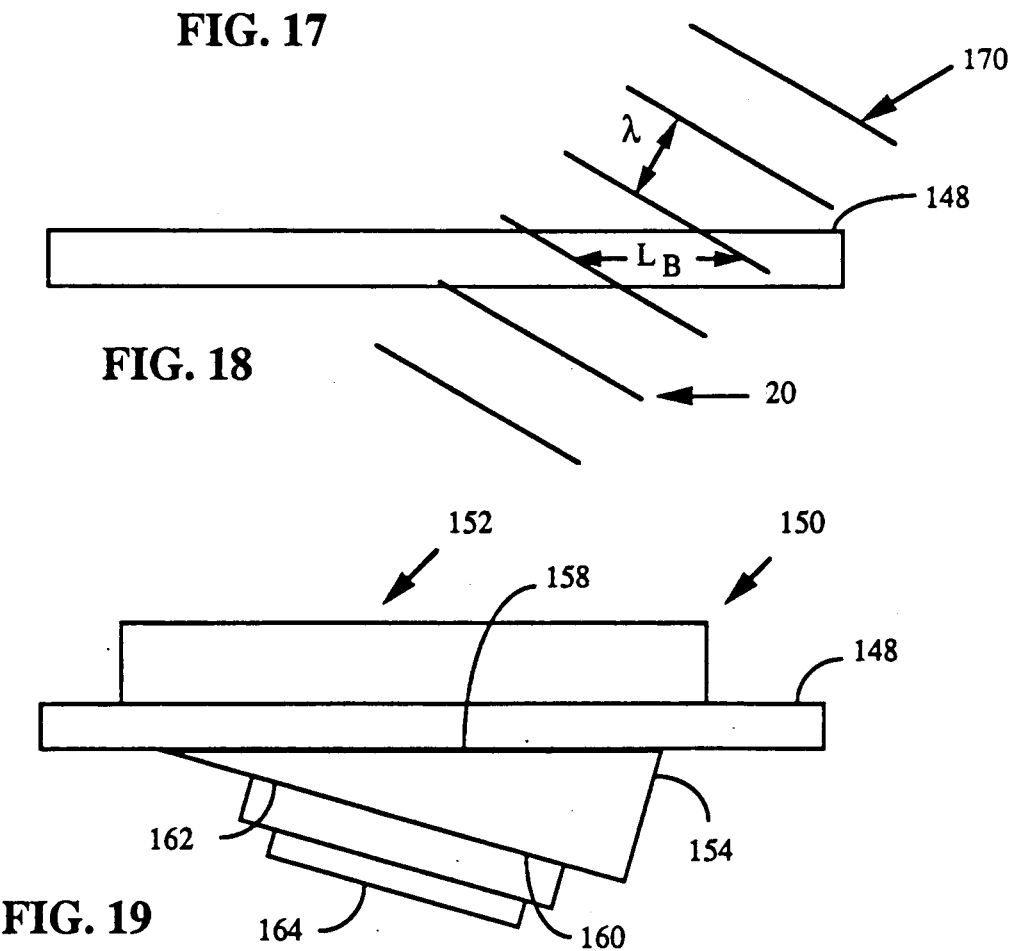
FIG. 18
FIG. 19

INTERFEROMETER CALIBRATION FOR FIBER OPTIC SENSOR ARRAYS

BACKGROUND OF THE INVENTION

This invention relates to fiber optic interferometric sensors that respond to perturbations such as acoustic wavefronts by producing a phase difference in two light beams propagated by fiber optic material. Still more particularly, this invention relates to methods and apparatus for cailbrating signal processing channels of fiber optic interferometric sensor arrays for use in sensing acoustic energy.

Optical fibers can be made sensitive to a large number of physical phenomena, such as acoustic waves and temperature fluctuations. An optical fiber to such phenomena changes the amplitude, phase or polarization of light guided by the fiber. Optical fibers have been considered for use as sensing elements in devices such as hydrophones, magnetometers, accelerometers and electric current sensors.

Mach-Zehnder, Michelson, Sagnac, and resonant ring interferometers have been used as sensors. Mach-Zehnder, Michelson and Sagnac interferometers respond to the phenomenon being sensed by producing phase differences in interfering light waves. Detecting phase changes in the waves permits quantitative measurements to be made on the physical quantity being monitored. The Sagnac interferometer produces phase differences in two counter-propagating light waves in a coil of a single fiber in response to rotations about the axis of the coil.

The Mach-Zehnder interferometer is particularly suited for sensing acoustic vibrations. A fiber optic Mach-Zehnder interferometer typically has a reference arm comprising a first length of optical fiber and a sensing arm comprising a second length of optical fiber. An optical coupler divides a light singal between the two arms. The sensing arm is exposed to a physical parameter, such as an acoustic wavefront, to be measured while the reference arm is isolated from changes in the parameter. A second coupler recombines the signals after the sensing arm is exposed to the parameter to be measured. When the Mach-Zehnder interferometer is used as an acoustic sensor, acoustic wavefronts change the optical length of the sensing arm as a function of the acoustic wave amplitude. The signals are recombined after they have propagated through the reference and sensing arms, and the phase difference of the signals is monitored. Since the signals in the reference and sensing arms had a definite phase relation when they were introduced into the arms, changes in the phase difference are indicative of changes in the physical parameter to which the sensing arm was exposed.

The Michelson interferometer is similar to the Mach-Zehnder except that the Michelson interferometer includes only one coupler. Mirrors terminate the ends of the fibers and reflect the light back toward the input.

SUMMARY OF THE INVENTION

This invention provides methods and apparatus for producing a switch-selectable calibration signal for monitoring operation of an interferometric sensor channel. The methods and apparatus according to the present invention are particularly useful in connection with fiber optic sensor arrays, which may contain hundreds or more identical sensors. The present invention provides for the application of a calibration signal at a single physical location to determine the channel scale factors and proper operability of multiple sensors at remote locations in the array. Such calibration methods are presently used for conventional sensor arrays employing piezoelectric sensors. However, these same techniques cannot be used to calibrate fiber optic sensor arrays.

A system according to the invention for calibrating a fiber optic sensor array that includes at least one fiber optic interferometric sensor comprises means for providing an optical signal input to each interferometric sensor channel in the array and a compensating interferometer for receiving optical signals output from the fiber optic sensor array. The system further includes means for applying a signal to the compensating interferometer to form an output signal that simulates signals output from each interferometric sensor in the array. The system also includes means for processing signals output from the compensating interferometer to determine the scale factor (in volts per radian) of each interferometer in the fiber optic sensor array.

The compensating interferometer may include a phase modulator for modulating the phase of light in one arm of the interferometer to produce signals that are a superposition of the signals output from the fiber optic sensor array and this modulating signal.

The means for providing an optical signal input to each interferometric sensor in the array preferably comprises a laser diode, means for generating a pluse signal, and means for modulating light output from the laser diode with the pluse signal to form a plused light wave that is a time-gated optical signal.

The system according to the invention may further comprise means for synchronizing application of the phase modulation signal to the compensating interferometer with the arrival of signals from the interferometric sensors. The system also preferably includes means for demultiplexing signals output from the compensating interferometer to correlate pulses in the signals with the interferometric sensors so that the scale factor of each interferometric sensor may be determined and means for demodulating the outputs from the demultiplexing means.

The compensating interferometer may be either a Mach-Zehnder or a Michelson interferometer connected to the fiber optic sensor array to receive signals output from each of the interferometric sensors in the array.

The means for applying a signal to the compensating interferometer may include means for shifting the frequency of light in the compensating interferometer to produce signals that are a superposition of the signals output from the fiber optic sensor array and a frequency modulating signal.

The invention may be formed as system for calibrating the sensor channels of a fiber optic frequency division multiplexed sensor array that includes at least one fiber optic interferometric sensor. The invention may comprise a bias current source and a summing circuit connected to the bias current source to receive a bias signal therefrom. A carrier modulation generator and a calibration frequency generator may be connected to the summing circuit to provide carrier modulation and calibration frequency signals thereto. A light source is connected to the summing circuit to receive therefrom a signal that is the sum of the bias signal, the carrier modulation signal and the calibration frequency signal and connected to the sensor array for providing an optical signal input to each interferometric sensor in the array. A switch may be connected between the summing circuit and the calibration frequency generator so that the calibration frequency signal may be selectively applied to the light source.

The method of the invention for calibrating a fiber optic sensor array that includes at least one fiber optic innterferometric sensor comprises the steps of providing an optical signal input to each interferometric sensor in the array and receiving optical signals output from the fiber optic sensor array with a compensating interferometer. The method also includes the step of applying a signal to the compensating interferometer to form an output signal that simulates signals output from each interferometric sensor in the array. The method further includes the step of processing signals output from the compensating interferometer to determine the scale factor of each interferometric sensor channel, in volts/-radian, in the fiber optic sensor array.

The step of applying a signal to the compensating interferometer may include the step of modulating the phase of light in the compensating interferometer to produce signals that are a superposition of the signals output from the fiber optic sensor array and a modulating signal.

The step of providing an optical signal input to each interferometric sensor in the array may comprise the steps of providing a laser diode, generating a pluse signal, and modulating light output from the laser diode with the pluse signal to form a plused light wave that is a time-gated optical signal. The method of the invention may further comprise the steps of demultiplexing signals output from the compensating interferometer to correlate pluses in the signals with the interferometric sensors so that the scale factor of each interferometric sensor channel may be determined, and demodulating the outputs from the demultiplexing means.

The method of the invention may include shifting the frequency of light in the compensating interferometer to produce signals that are a superposition of the signals output from the fiber optic sensor array and a frequency modulating signal.

BRIEF DESCRIPTION OF THE DRAWINGS

FIG. 2 schematically illustrates a first discrete fiber optic sensing architecture for practicing the present invention;

FIG. 3 schematically illustrates a second discrete fiber optic sensing architecture for practicing the present invention;

FIG. 4A and 4B schematically illustrate applicability of the present invention for use in distributed fiber arrays;

FIGS. 16 and 17 illustrate the effect of a frequency shifter on an optical wave;

FIGS. 18 and 19 illustrate a second frequency shifter structure that may be used in the present invention;

DESCRIPTION OF THE PREFERRED EMBODIMENT

Figure 1:
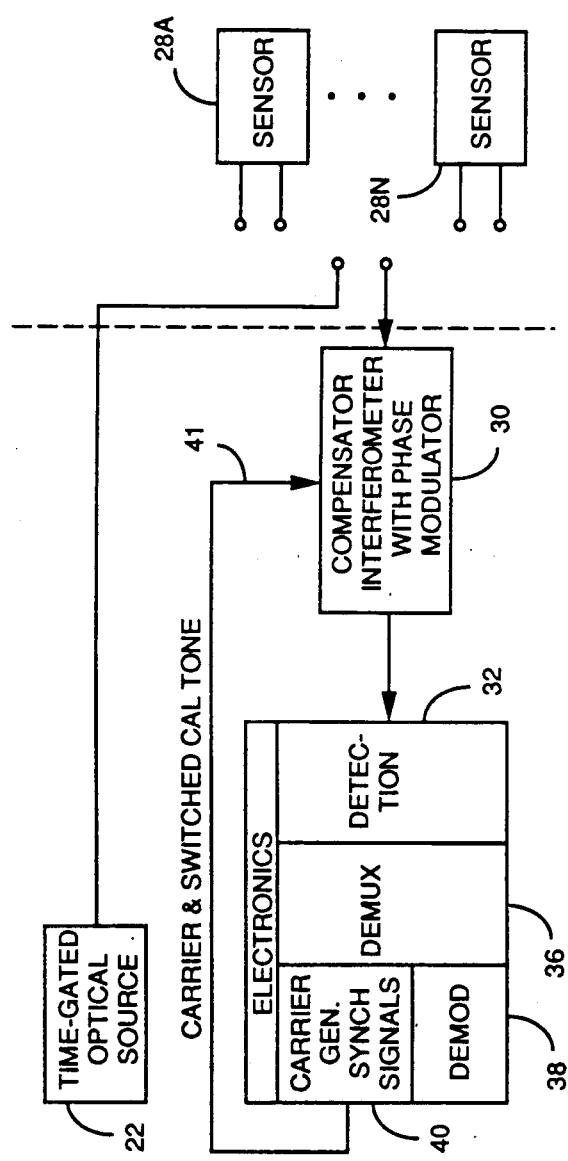
FIG. 1 is a block diagram of the apparatus of the present invention for generating a calibration tone for a hydrophone demodulator.

Referring to FIG. 1, a calibration system 20 includes a time-gated optical source 22 that provides a pulsed light signal at a specified repetition frequency. The time-gated optical source 22 may include a laser diode 24 and a pluse generator 26 shown in FIG. 2. The laser diode 24 and the pulse generator 26 cooperate to permit the laser diode output to be input to the system in pulses at a specified repetition frequency.

The output of the time-gated optical source 22 is selectively fed to a fiber optic sensor array 28 that preferably includes a plurality of sensors 28A, 28B,... 28N as shown in the block diagram of FIG. 1. The sensors provide output signals to a compensating interferometer 30, which then provides an optical output to a detector 32, which is included in an electronics module 34.

The electronics module 34 also includes a demultiplexer 36, demodulator 38.

FIG. 2 illustrates a sensing system with which the calibration system 20 may be used. The sensing system of FIG. 2 is shown to comprise a corresponding mismatched pathlength interferometer 29A, 29B, etc. The interferometers 29A, 29B, etc. are shown to be Michelson interferometers. However, the invention is not limited to the use of Michelson interferometers, but may be used with any type of mismatched pathlength interferometer, such as a Mach-Zehnder interferometer. The structures and operational characteristics of both the Michelson and Mach-Zehnder interferometers are described in detail subsequently.

Still referring to FIG. 2, the laser diode 24 provides an optical pulse signal 24A to a transmit telemetry optical fiber 42. The optical fiber 42 preferably has a cladding (not shown) surrounding a core (not shown) that guides a single mode of electromagnetic energy. The input signal propagates in the optical fiber 42 to a directional coupler 44A. A first portion of the optical signal incident upon the coupler 44A propagates through it and therefore remains in the fiber 42. A second portion of the signal cross couples into an optical fiber 46A.

The optical fiber 46A then guides the signal to an optical coupler 48A. The coupler 48A, an optical fiber 50A, a portion 52A of the optical fiber 46A extending through the coupler 48A, and mirrors 54A and 56A attached to the ends of the fibers 46A and 50A, respectively, are included in the Michelson interferometer 29A.

Figure 20:
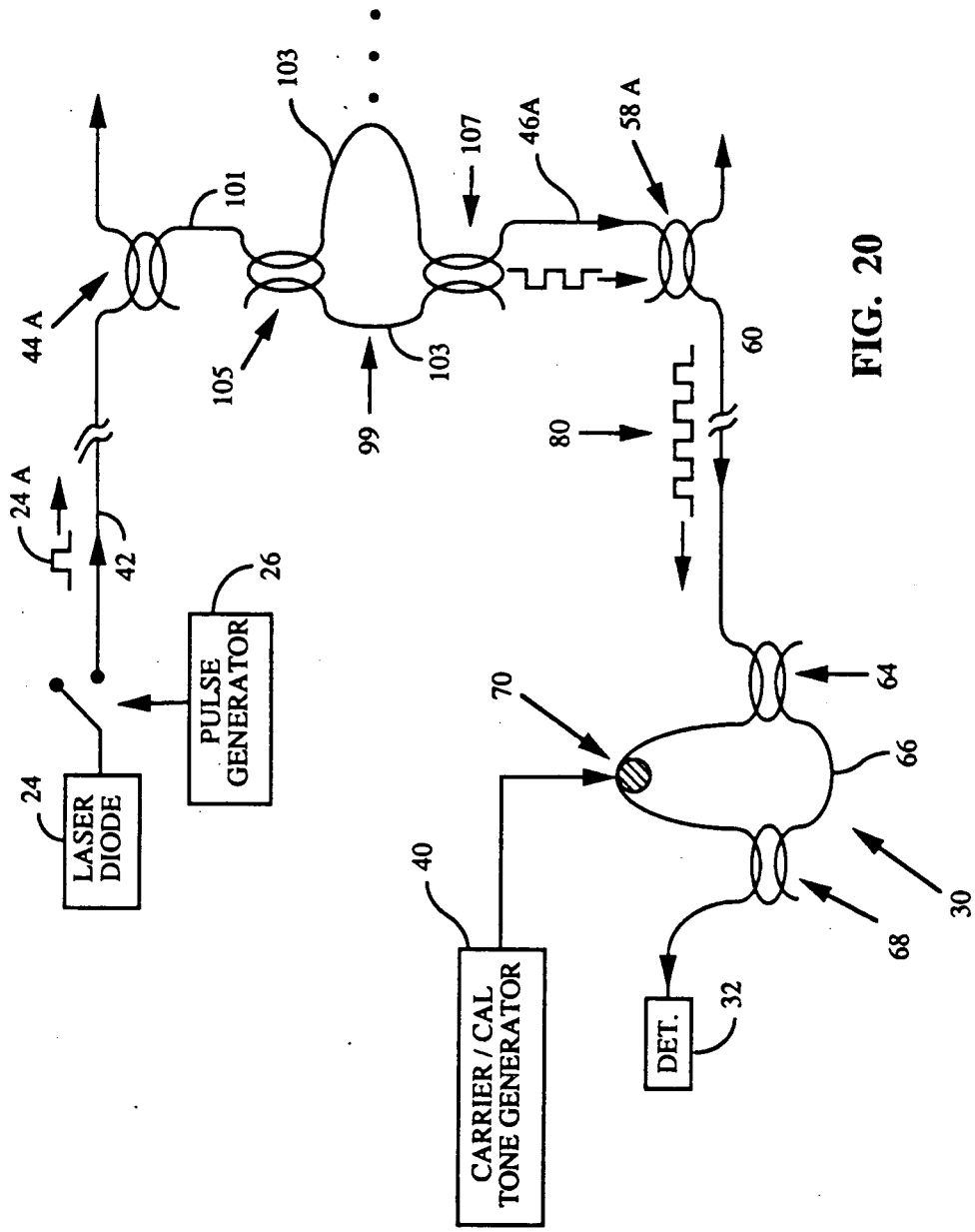
FIG. 20 illustrates a structure for a fiber optic Mach-Zehnder interferometer that may be used in the present invention.

Referring again to FIG. 2, the Michelson interferometer 29A suitable for use as a sensor in the system 20 comprises the fiber optic directional coupler 48A and the sensing fiber portion 52A. The sensing fiber portion 52A terminates at the mirror 54A. Light from the laser 24 is coupled into the optical fiber 46A, which guides the light to the coupler 48A. Part of the incident light propagates through the coupler 48A for output to the sensing fiber portion 52A. The sensing portion 52A is exposed to the physical parameter being monitored. The mirror 54A reflects the input light signal back through the sensing portion 52A to the coupler 48A. The coupler 48A couples a portion of the signal that has been exposed to the parameter being monitored into the fiber 50A. Changes in the parameter cause a phase shift in the light that has propagated through the sensing portion 52A. Light that does not propagate through the coupler 48A to the sensing portion 52A cross couples into the fiber 50A, which terminates in the mirror 56A. Light reflects from the mirror 56A back toward the coupler 48A and combines with the light reflected from the mirror 54A. The two reflected beams interfere and produce a fringe pattern indicative of the phase difference between the reflected beams. Part of the fringe pattern propagates toward the coupler 58A, which couples it into the receive fiber 60. The optical coupler 44A, the optical fiber 46A, the interferometer 29A, the optical fiber 50A and the coupler 58A comprise leg 65A of the fiber optic sensor system 20. Mach-Zehnder interferometers may be used in the sensor array 20 instead of the Michelson interferometers. Referring to FIG. 20, each leg of the array may include a Mach-Zehnder interferometer 99 that comprises a pair of optical fibers 101 and 103 and a pair of optical couplers 105 and 107 formed between the fiber 101 and 103. The coupler 44A couples light from the source 24 into the fiber 101. The light then propagates to the coupler 105 where a portion of the light couples into the fiber 103. The lengths of the fibers 101 and 103 between the couplers 105 and 107 are preferably different so that there is a time delay difference between the light beams after they traverse the two fibers. The beams combine in the coupler 107. The signal output of the Mach-Zehnder interferometer 99 appears at coupler 107 and is a distinct, sepatrated pulse pair from the two fibers 101 and 103. The Mach-Zehnder interferometer output is taken at fiber 103 and input to the coupler 58A.

The interferometer 29A provides a signal to a fiber optic coupler 58A, which couples light between the fiber 46A and a receive telemetry fiber 60. The coupler 58A, the optical fiber 46A, the interferometer 28A, the optical fiber 56A and the coupler 58A comprise a leg 65A of the fiber optic sensor system 28.

The signal coupled into the receive fiber 60 propagates to the compensating Mach-Zehnder interferometer 30. The interferometer 30 comprises an optical coupler 64, the receive fiber 60, an optical fiber 66, an optical coupler 68 and a phase modulator 70. The receive fiber 60 and the optical fiber 66 extend between the optical couplers 64 and 68. The phase modulator 70 is shown to be in the portion of the receive fiber 60 that is between the optical couplers 64 and 68, but the present invention functions satisfactorily if the phase modulator 70 is in the other arm of the interferometer 30.

The optical coupler 64 couples part of the signal from the receive fiber 60 into the optical fiber 66. The optical coupler 68 combines the portion of the signal remaining in the receive fiber 60 with a portion of the signal coupled into the optical fiber 66. The detector 32 receives the signal from the receive fiber 60 and produces an electrical signal indicative of the interference pattern formed by the superposition of the optical signals guided by receive fiber 60 and optical fiber 66.

Referring to FIG. 2, the portion of the signal from the laser diode 24 remaining in the optical fiber 42 beyond the coupler 44A propagates to a coupler 44B. The optical coupler 44B couples a portion of the light incident thereon into an optical fiber 46B, which guides the light to the Michelson interferometer 29B. The interferometer 29B includes a coupler 48B, a portion 52B of the fiber 46B, a mirror 54B on the end of the fiber portion 52B, an optical fiber 50B and a mirror 56B on the end of the fiber 50B. The output of the interferometer 29B is input to a coupler 58B, which couples light from the interferometer 28B into the receive fiber 60. The optical coupler 44B, the optical fiber 46B, the interferometer 29B, the optical fiber 56B and the coupler 58B comprise a leg 65B of the fiber optic sensor system 20.

The fiber optic sensor system 28 may include any number of legs 65A, 65B, etc. with couplers 44A, 44B, etc., optical fibers 46A, 46B, etc., interferometers 29A, 29B, etc., optical fibers 56A, 56B, etc., and couplers 58A, 58B, etc. A preferred embodiment of the system 28 for use as an acoustic sensor includes eight such legs.

A symmetrical fiber optic directional coupler suitable for use in single mode fiber implementations of the invention is described in the Mar. 29, 1980 issue of *Electronics Letters*, Vol. 18, No. 18. pp. 260–261 and in U.S. Pat. No. 4,493,528 issued Jan. 15, 1985 to Shaw et al. That patent is assigned to the Board of Trustees of the Leland Stanford Junior University. The disclosure of of that patent is hereby incorporated by reference into this disclosure.

Figure 9:
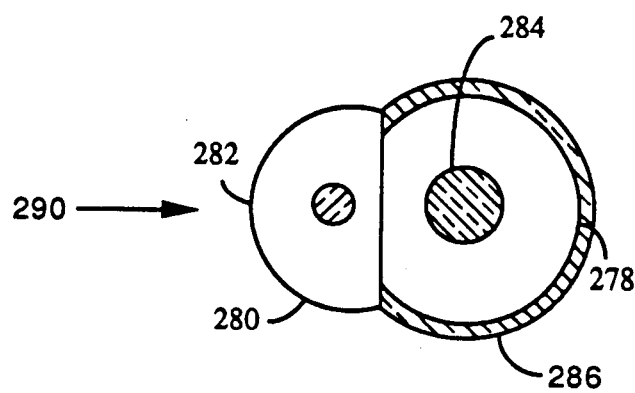
FIGS. 9-11 illustrate a fiber and two different couplers.

Some applications of the invention may include couplers that have asymmetric coupling characteristics. There are several structures possible for providing an asymmetric coupler. FIG. 9 shows a directional coupler 290 formed from a pair of single mode fibers 278 and 280 from which portions of the claddings have been lapped to permit the cores to be placed close enough together to permit evanescent coupling between waves guided by the two fiber cores. The fiber 280 is shown to have a core 282 that is smaller in diameter than the core 284 of the other fiber. The directional coupler 290 formed between the fibers 278 and 280 having different diameters of cores provides a higher coupling efficiency for light input to the smaller core 282. The interaction region of the fibers 278 and 280 is large enough so that the evanescent field of the light in the smaller core 282 interacts with the larger core 284 more effectively than the evanescent field of the light in the smaller core 282 interacts with the larger core 284. The smaller core diameter may be approximately $4\mu$, and the diameter of the larger core may be about $8\mu$. An important feature of the coupler configuration of FIG. 9 is that part of the light from the large core is coupled into a cladding mode of the smaller fiber rather than coupling into the smaller core 282. The cladding modes may be stripped from the larger fiber by using a fiber having an absorbing jacket 286 formed around its cladding.

Figure 10:
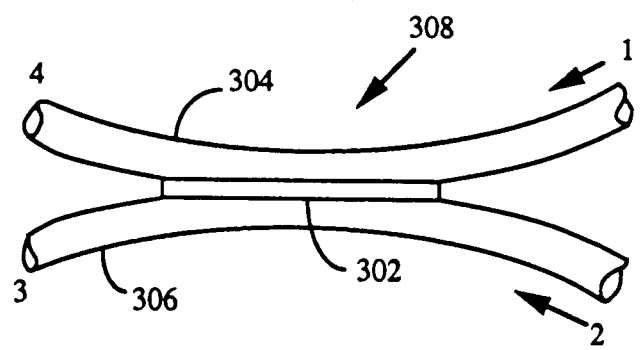

Referring to FIG. 10 an asymmetric coupler 300 may be formed by placing a buffer layer flim 302 between flattened portions on a pair of optical fibers 304 and 306. The buffer layer 302 is formed of a material that has greater loss for cross coupling in one direction across the interaction region than for the other direction.

Figure 11:
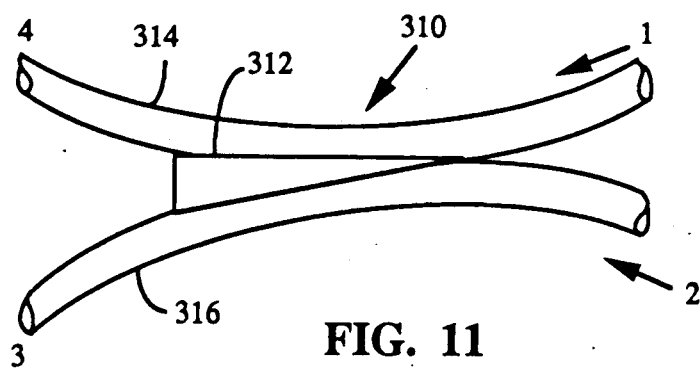

Referring to FIG. 11, a fiber optic directional coupler 310 includes a wedge 312 formed of a crystalline material placed between the flattened portions of a pair of fibers 314 and 316. The wedge 312 makes the interaction region to the fibers asymmetrical about their centers of curvature. Therefore, coupling will be greater for light incidents upon ports 1 and 2 than upon light incident upon ports 3 and 4.

Referring again to FIGS. 1 and 2, the coupling constants of the couplers 44A, 44B, etc. on the input optical fiber 42 and the coupling constants of the couplers 58A, 58B, etc. on the return fiber 60 preferably are weighted such that each sensing interferometer 29A, 28B, etc. receives and returns an equal amount of optical power.

The optical path length difference existing at each sensor at a particular time is determined by sending a pluse of optical energy out through the input optical fiber 42. A portion of the pulse is tapped off so that it enters each sensor. At the couplers 48A, 48B, etc. one-half of the input pulse is coupled into the long arm 52A, 52B, etc. of the interferometers 29A, 29B, etc., and the remaining half propogates through the short arms 50A, 50B, etc. In traversing the long and short paths in a particular interferometer, the light picks up a static phase delay. The pulse width is chosen such that two distinct, time-separated pulses of light exit from each sensor interferometer 29A, 29B, etc. These pulse pairs are returned back toward the detector 32 from each sensor head via the return telemetry fiber 60. The length of the fiber 60 linking each telemetry coupler 58A, 58B, etc. must be greater than or equal to the pathlength difference of each sensor interferometer 29A, 29B, etc. to prevent overlapping of pulses from successive sensors. In FIG. 2, the reference numeral 80 indicates the returning train of pulses from the sensing interferometers entering the compensating interferometer 30.

To measure differential changes in optical path length in any one of the sensing interferometers 29A, 29B, etc., the pulses from the two arms must be superimposed in time and photodetected. Passing the pulse pairs through the serially connected interferometer 30 with a pathlength difference identical to the pathlength difference of the sensor head interferometers 29A, 29B, etc. accomplishes this function. This interferometer must be well-isolated from both the field quantity being measured and any disturbances that could cause a modulation of the pathlength difference in either the bandwidth or dynamic range of interest.

As shown in FIG. 2, a phase modulator 70 is placed in the long arm of the interferometer 30. However, the phase modulator 70 could be placed in either arm, and operation would be equivalent. The carrier generator 40 supplies driving signals to the phase modulator 70 at a frequency outside the bandwidth of the sensed information, yet no greater than one-half the optical pulse repetition rate. Pulses passing through the leg of the interferometer 30 containing the phase modulator 70 pick up this high frequency, large amplitude modulation. The pulse train is superimposed with a time-delayed or time-advanced replica of itself and photodetected, to shift information away from the baseband so that it appears as modulation sidebands about the modulation frequency.

Each of these paths run to an individual sensor. As perturbations in the environment surrounding the individual sensors occur, acoustic pressure waves are produced. Pressure waves impinge upon the optical fibers within the sensors 28 when they come into contact with the sensor. Pressure on the optical fiber causes the phase of the light propagating therein to change.

Referring to FIG. 2, the compensating interferometer 30 creates a signal indicative of an acoustic input wave detected by the sensors. A portion of the light input to the coupler 64 is coupled from the fiber 60 into the fiber 66. The coupler 68 couples a portion of the signal in fiber 66 back into the fiber 60 for output to the detector 32. The coupler 68 combines portions of the signals in the fibers 60 and 66 and produces an output signal that is a superposition of portions of the reference and sensing signals. The result of combining the reference and sensing signals is the formation of an interference pattern between the reference and sensing signals. This interference pattern is a function of the phase difference $\phi$ betweem the signals.

Figure 5:
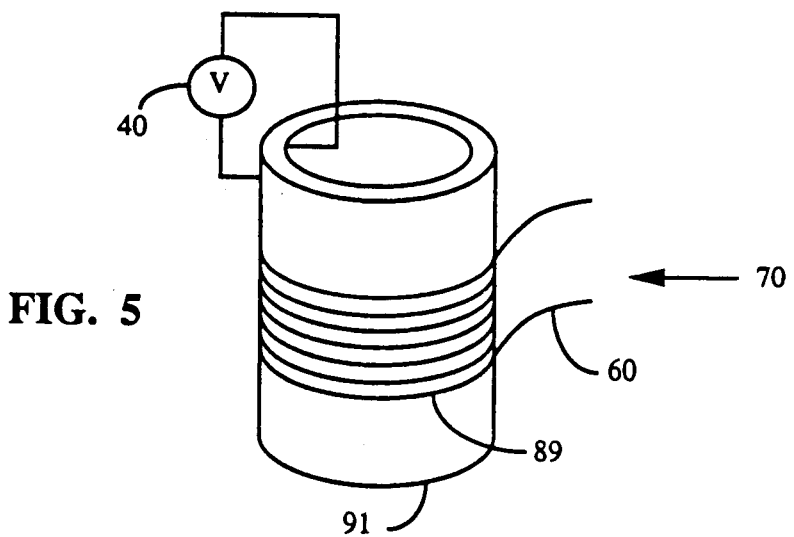
FIG. 5 illustrates a first type of fiber optic phase modulator that may be included in the apparatus of the invention.

Referring to FIG. 5, the phase modulator 70 may include a coil 89 of fiber 60 is wrapped around a piezoelectric mandrel 91. The subsequent expansion and contraction of the piezoelectric mandrel 91 produces a phase modulation in light propagating in the fiber 60 between the couplers 64 and 68 of FIG. 2. The signal which produces this modulation is provided by the carrier signal generator 40 of FIGS. 1 and 2. The calibration tone (preferably at an audio frequency within the signal bandwidth) is added to the high frequency, high-level carrier. The output of the carrier signal generator 40 is the carrier and switched calibration tone, which has a phase factor $\exp[j(B \sin\omega_c t + m \sin \omega_a t]$. The frequency $\omega_a$ is the frequency of the switched calibration signal, and m is the amplitude of the switched calibration signal. B is the amplitude of the carrier signal, and $w_c$ is the frequency of the carrier signal.

Figure 12:
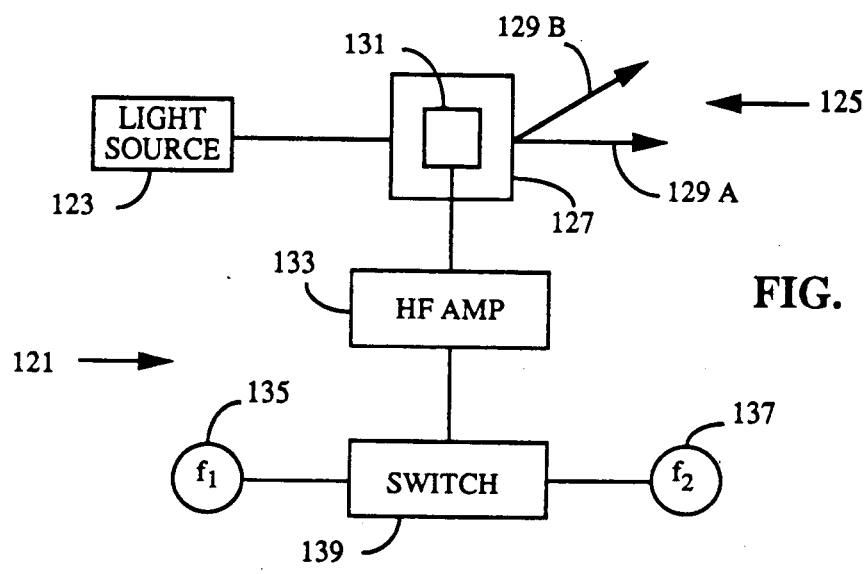
FIG. 12 illustrates a Bragg cell that may be used to shift the frequency of light in the present invention.
Figure 6:
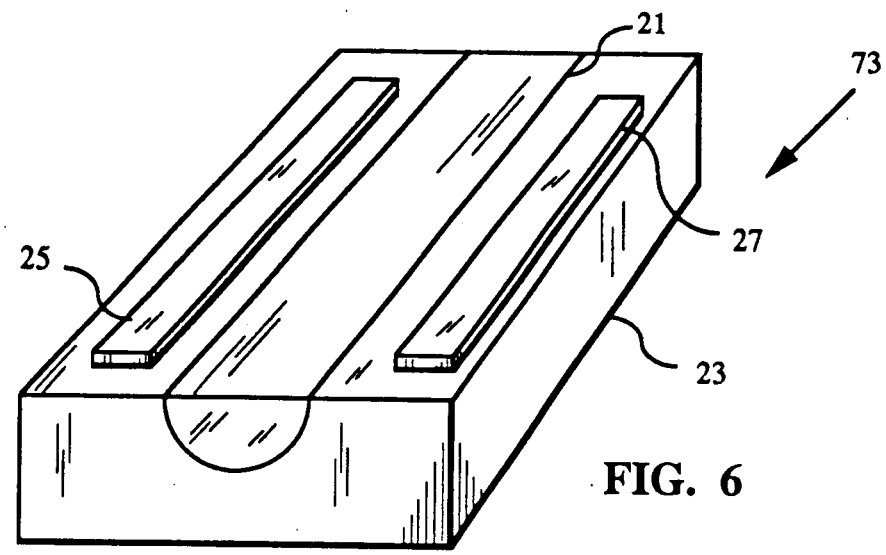
FIGS. 6-8 illustrate a second type of phase modulator that may be included in the apparatus of the invention.
Figure 7:
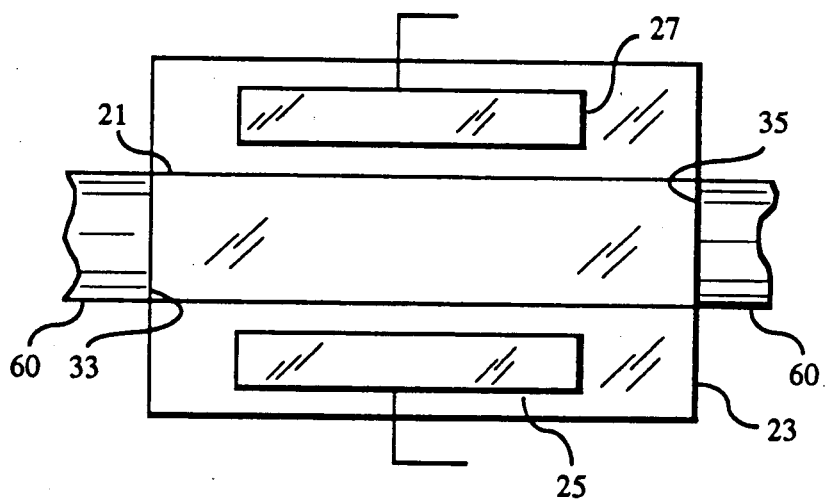
Figure 8:
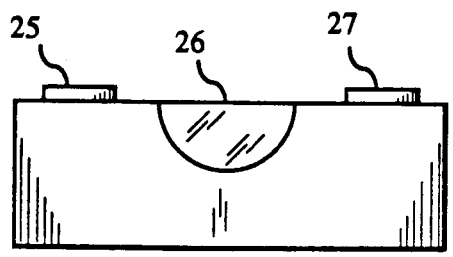

FIGS. 6-8 illustrate a second type of phase modulator 73 that may be used in the present invention. Referring to FIGS. 6-8, the phase modulator 73 may comprise an optical waveguide 21 formed on a substrate 23 of an electrooptically active material such as lithium niobate. A pair of electrodes 25 and 27 are attached to the substrate on opposite sides of the waveguide 21. The electrodes 25 and 27 may be formed on the substrate 23 by vapor deposition of aluminum. The optical waveguide 21 may be formed in the substrate 23 by first depositing a strip of titanium on the substrate 23 and heating it to drive the titanium into the substrate 23.The resulting waveguide 21 may have a generally semicircular cross section as shown in FIGS. 10 and 12. It is also possible to form the waveguide 21 to have a generally rectangular cross section. The fiber 60 is cut to have two ends 33 and 35 that are butt coupled to opposite sides of the optical waveguide 21 as shown in FIG. 7.

Application of a voltage across the electrodes changes the refractive index of the optical waveguide 21 by means of the electrooptic effect. The transit time of a light wave through the waveguide 21 is the product of the length of the waveguide and is refractive index divided by the speed of light in vacuum. Changing the refractive index of the optical waveguide 21 thus changes the transit time of an optical signal through it. Because of the sinusoidal nature of the electromagnetic fields that comprise the light wave, the change in transit time is seen as a change in phase of the wave. TRW sells a lithium niobate phase modulator device that is suitable for use as the phase modulator 73.

Figure 22:
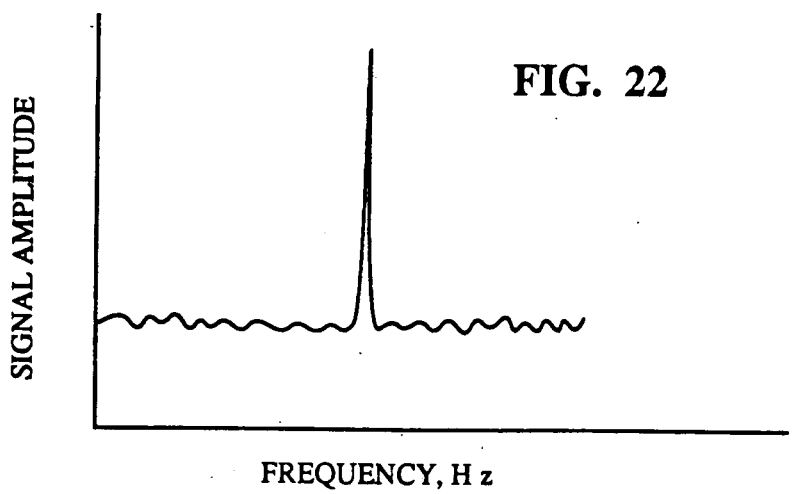
FIG. 22 is a waveform of the calibration tone.

FIG. 22 illustrates a typical waveform for the calibration tone and sensor signal. When the calibration tone is off, the sensor signal is represented by $i(h) = I_o \cos(B \sin\omega_c t + s(t)$, where the term $B \sin\omega_c t$ represents the carrier phase modulation and the term $s(t)$ represents the acoustic signal. When the calibration tone is on, the sensor signal is represented by $i(h) = I_o \cos(B \sin\omega_c t + m \sin\omega_a t + s(t))$, where the additional term $m \sin \omega_a t$ represents the calibration tone. The calibration tone is of high amplitude and short duration, and is represented in FIG. 22 by a spike in the waveform.

The audio signal simulates a signal in the sensor array 28. Applying the audio signal to the system via the phase modulator 70 applies the signal to all channels in the array. For example, if the calibration signal has a frequency of 400 Hz, this signal will be applied with the same amplitude to the output of all sensors in the array 20. The signal in the fiber 60 has a phase factor $\exp[j(B \sin\omega_c t + m \sin\omega_a t + \Delta)]$. The parameters $B$ and $\omega_c$ are the amplitude and frequency, respectively, of the carrier signal in the fiber 60. The parameters $m$ and $w_a$ the amplitude and frequency, respectively of the switched calibration tone. B is typically about 1.87 radians and m is typically 50 milliradians (RMS). The ratio B/m is a constant that is normally equal to about 100. The parameter m is known from the output of the carrier/calibration tone generator 100. Therefore, the parameter B may be calculated.

Figure 21:
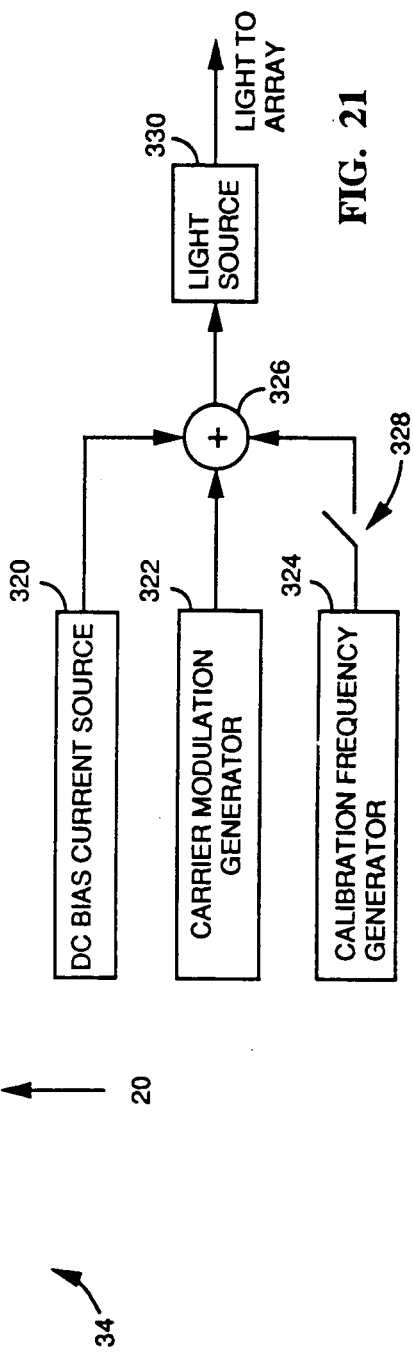
FIG. 21 is a generalized block diagram of an embodiment of the invention suitable for calibrating a frequency division multiplexed sensor array.

Referring to FIG. 21, the invention may be used to calibrate a frequency division multiplexed sensor array. A calibration tone is summed with a high-level, high frequency carrier and used to frequency modulate a laser diode directly. The invention may include a DC bias current source 320, a carrier modulation generator 322 and a calibration frequency generator 324 all connected to a summing circuit 326. The carrier modulation generator 322 modulates the frequency of the light. A calibration switch 328 is connected between the calibration frequency generator 324 and the summing circuit so that the calibration signal may be selectively applied to the summing circuit for combination with the other signals input thereto. The summing circuit combines signals output from the DC bias current source 320, the carrier modulation generator 322 and the calibration frequency generator 324 to produce a signal that is input to a laser diode 330, which provides light to the sensor array.

The calibration method has been described with reference to a fiber optic system that phase modulates the optical wave in one arm of the compensating interferometer. The calibration may also be accomplished by replacing the phase modulator of FIG. 2 with a frequency shifter and shifting the frequency of the optical signal rather than phase modulating it.

Referring to FIG. 12, a frequency shifter 121 may be formed to include a Bragg cell 131. A suitable frequency shifting technique may include a serrodyne frequency shifter as shown in FIGS. 15–16 or an acoustooptical frequency shifter as shown in FIGS. 18–19.

Referring to FIG. 12, the Bragg cell 131, which is well-known in the optical arts, comprises a glass slab 127 driven by an acoustic transducer 125, which launches acoustic waves into the glass slab 127. Applying modulating signals of frequency $\omega_m$ to the acoustic transducer 125 controls the frequency of the acoustic waves in the glass slab 127. The acoustic wavefronts in the glass slab 127 function as a moving diffraction grating, which transmits a first portion 129A of the incident optical beam and reflects a second portion 129B. If the optical signal has frequency $\omega_o$, then the portion 129B of the beam reflected from the Bragg cell 131 has frequency $\omega_o + \omega_m$; and the transmitted portion of the beam has the original frequency $\omega_o$. In a typical Bragg cell, approximately 60% to 70% of the incident optical energy is reflected and shifted in frequency.

As shown in FIG. 12, the Bragg Cell 131 receives an input signal from an HF amplifier 133, which amplifies the modulating signal. The output of the HF amplifier 133 is under the control of a pair of oscillators 135 and 137 that produce electrical signals of frequency $\omega_1$ and $\omega_2$. The signals output from the oscillators 135 and 137 are fed into a switch 139, which selectively inputs one of the signals of frequency $\omega_1$ or $\omega_2$ to the HF amplifier 133.

Figure 15:
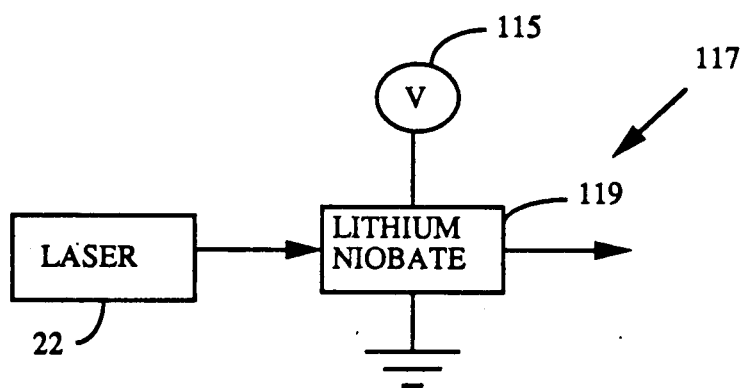
FIG. 15 illustrates apparatus for implementing the serrodyne frequency shifting technique.

A serrodyne frequency shifting system 117 is shown in FIG. 15. Optical signals from the laser 22 of FIG. 1 are input to an electrooptically active material 119, which may be lithium niobate. Applying a voltage from a voltage source 115 to the electrooptically active material 119 changes the phase of optical signals propagating therein. The amount of phase change may be controlled by controlling the voltage V from the voltage source 115 that is applied to the electrooptically active material 119.

The Bragg cell accomplishes optical frequency shifting by passing an optical signal through an electro-optic crystal having a three-fold axis and applying a rotating electric field to the crystal. To be frequency shifted, the optical beam is preferably circularly polarized and directed along the three-fold axis of the crystal. With no field applied, the crystal exhibits no birefringence, and the emergent beam is unaffected. When the applied field has the proper half-wave amplitude and rotates in a plane normal to the three-fold axis, the crystal functions as a rotating half-wave plate. The emergent beam has its optical frequency shifted and its sense of polarity reversed. The frequency shift is equal to twice the rotation rate of the applied field. Because a uniformly rotating applied field ideally results in a single new frequency in output beam, rotating field frequency shifters are often referred to as single-side-band-suppressed-carrier (SSBSC) modulators.

FIGS. 16 and 17 represent circularly polarized input light incident upon a half wave plate 140 that rotates at an angular frequency f. The input light has an angular frequency $f_o$. The input wave travels in the positive z-direction and has equal magnitude polarization vectors along the x- and y-axes. The polarization vectors are 90° out of phase. Therefore, the polarization vector appears to rotate at an angular velocity $f_o$ about the z-axis in a clockwise direction when viewed looking toward the direction of propagation. The half wave plate 140 rotates in the same direction as the polarization vector so that the output wave is shifted from the input frequency $f_o$ to have a frequency of $f_o + 2f$.

FIG. 17 graphically represents the possible frequency outputs from the frequency shifter. If the input frequency is $f_o$, then rotating the half-wave plate at a frequency f in the direction of the input beam produces an output of $f_o + 2f$. Rotating the half-wave plate 140 at the frequency f in a direction opposite to the polarization of the input wave produces an output wave having a frequency of $f_o - 2f$. Controlling the rotational frequency f permits the output frequency of the quarter wave plate to have a range of $f_o \pm 2f_{max}$, where $f_{max}$ is the maximum rotational frequency of the half wave plate 140.

A frequency shifter 150 that may be used in the present invention is shown in FIGS. 18 and 19. The frequency shifter 150 includes a length of optical fiber 148 retained between a block 152 formed of a material such as aluminum and a block 154 formed of a material such as fused quartz. The optical fiber 148 is preferably formed to propagate a single mode of electromagnetic energy in the optical frequency range. The quartz block 154 preferably is formed to have a wedge-shaped configuration so that a first surface 158 of the block contacts the optical fiber 148. A second surface 160 of the block 158 is oriented at an angle to the longitudinal axis of the fiber 148. The aluminum block 152 may be of any desired shape and is shown to have a rectangular cross section only for convenience of illustration. A metallic layer 162 comprising Cr-Au, for example, is formed on the surface, and a transducer 164, formed of PZT, for example, is mounted to the metallic layer 162. The PZT transducer may have a metallic layer of Cr-Au formed on a surface, which faces away from the surface of the quartz block. The transducer may be driven by a suitable oscillator to launch an acoustic wave in the fiber.

The fiber 148, being a single mode fiber, supports two orthogonal polarizations of the single propagation mode. There are two polarizations because the fiber is birefringent, having different refractive indices for different directions of the electric field in the fiber. The two polarizations are normally uncoupled so that there is no energy transfer from one polarization to the other. A spatially periodic stress pattern imposed on the fiber induces coupling between the two polarizations, leading to power transfer therebetween. The power transfer is cumulative only if the spatial period of the stress pattern equals the beat length of the fiber. The beat length of the optical fiber is $L_B = \lambda/\Delta n$, where $\Delta n$ is the difference in the refractive indices for the two polarizations and $\lambda$ is the optical wavelength. A stress pattern is most effective in causing coupling of the two polarizations when the stress is directed at 45 degrees to the principal axes of birefringence.

The transducer forms a moving stress pattern in the fiber by means of the travelling acoustic wave. If the stress pattern moves along the fiber, light coupled from one polarization to the other is shifted in frequency by an amount equal to the frequency of the moving stress pattern because of the motion of the coupling region. For convenience of reference, one of the polarizations will be referred to as "slow," and the other polarization will be referred to as "fast." The velocity of a light wave in a dielectric medium is the free space velocity of light divided by the refractive index of dielectric, i.e., $v = c/n$. Therefore, it may be seen that in a birefringent medium the polarization for which the refractive index is the greater is the slow wave; and the polarization for which the refractive index is smaller is the fast wave.

Referring to FIG. 18, line 170 represents a plane acoustic wavefront of wavelength $\lambda_a$ incident upon the fiber 148. Phase matching occurs when the component of the beat length $L_B$ in the direction of propagation of the acoustic wave equals the acoustic wavelength $\lambda$. Therefore, from FIG. 18 it is seen that $L_B \sin\theta = \lambda_a$. Using a well-known relation between wave velocity, frequency and wavelength to eliminate the acoustic wavelength from the preceding equation gives the acoustic frequency as $$f = \frac{v}{L_B \sin\theta},$$

where v is the acoustic wave velocity in the fiber.

Figure 13:
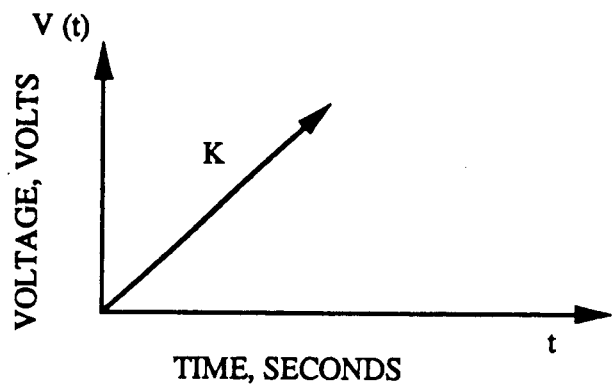
FIGS. 13-14 illustrate a serrodyne frequency shifting technique that may be included in the apparatus of the present invention.

The serrodyne technique of frequency shifting incorporates a linear optical phase shifter driven with a ramp signal. This ramp signal produces a linearly time varying phase shift, which is in essence, a frequency shift for the duration of the ramp. The optical frequency produced is determined by the time rate of change of the ramp and the scale factor of the phase shifter. Fig. 13 graphically illstrates a ramp voltage that increases linearly with time at a rate of K v/s.

Figure 14:
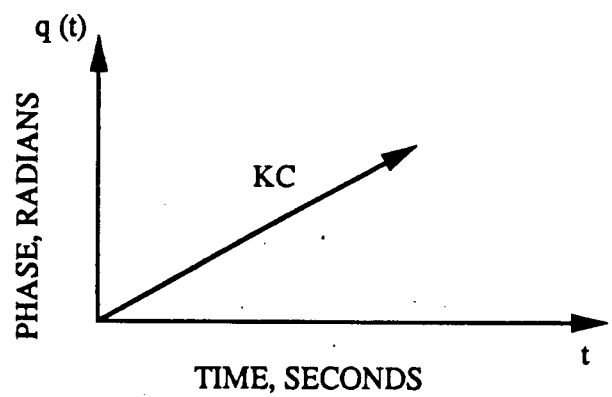

FIG. 14 graphically illustrates the phase of an optical signal output from a modulator driven by the ramp voltage of FIG. 13. The time rate of change of the phase is the frequency shift. Referring to FIG. 14, therefore, the frequency shift is $d\theta(t)/dt = KC$, where C is the modulator scale factor. Two exemplary methods for implementing the serrodyne frequency shifting technique are described below with reference to FIGS. 15 and 16.

FIG. 3 illustrates a full ladder sensing architecture 100. The gated optical source 22 provides an optical signal via a fiber 98 to a fiber optic coupler 102, which is preferably a 3dB coupler. Half of the signal from the gated optical source 22 remains in the optical fiber 98 and the remainder couples into an optical fiber 104 and then exits the sensor array. Ligth remaining in the optical fiber 98 after the coupler 102 impinges upon a coupler 106, which couples a portion of the incident light into an optical fiber 108.

Light coupled into the fiber 108 is then guided to a sensor 110 that is shown to be a Michelson interferometer. The structure of the Michelson interferometer is similar to that of the Michelson interferometer 29A described with reference to FIG. 2. The interferometer comprises a fiber optic coupler 112, a length of optical fiber 114, a coil 116 formed in the optical fiber 108, and mirrors 118 and 120 that terminate the fibers 116 and 114, respectively.

The interferometer responds to changes in a physical parameter being sensed, such as acoustic pressure, and outputs signals from the coil 116 and the fiber 112 back to the coupler 106 for transmission back to the coupler 102. Since the coupler 102 is a 3 dB coupler, half of the signal from the interferometer is coupled into the fiber 104. The fiber 104 guides the signal to the compensating interferometer 30, which is preferably identical to the compensating interferometer 30 shown in FIG. 2. The output of the compensating interferometer 30 is then incident upon the detector 32 for processing as described previously.

The sensor array 100 preferably includes at least one additional sensor 122 that is coupled to the optical fiber 98 via a fiber optic coupler 124. The structure of the sensor 122 is identical to the structure of the sensor 110. The sensor array 100 eventually terminates in a sensor 130 that is preferably a Michelson interferometer substantially identical to the sensor 110.

Referring to FIG. 4A, the invention may be practiced with a full ladder distributed sensing architecture 138. The gated optical source 22 provides an optical signal to an optical fiber 139 which guides the signal to a fiber optic coupler 140. Part of the signal remains in the coupler 140 and part of the signal is cross-coupled to an optical fiber 142. The optical fiber 142 guides light propagating therein from the optical source to an optical coupler 144, which couples light from the optical fiber 142 to a receive fiber 146. The receive fiber 146 then guides the light to the compensating interferometer 30. The output of the interferometer 30 is then input to the detector 32 for processing as described above.

Light remaining in the optical fiber 139 after the coupler 140 then passes through a coil 145 of optical fiber formed between the coupler 140 and a coupler 149. The coupler 149 couples part of the light from the coil 145 into an optical fiber 151 which then guides the sensor signal to a coupler 153 for input to the receive fiber 146.

Ligth remaining in the optical fiber 139 after the coupler 149 is then guided to subsequent coils 157, 159, etc. Light output from the coupler 153 to receive fiber 146 is then guided to the coupler 144 where part of the light is then cross-coupled into the fiber 142 and then lost from the array. Light from the coupler 153 remaining in the fiber 146 then impinges upon the compensating interferometer 30.

FIG. 4B, shows a second type of distributed array with which the invention may be used. The gated optical source 22 provides an optical signal to an optical fiber 169, which then guides the light to an optical coupler 172. The coupler 172 is preferably a 3dB coupler. Therefore half of the light incident upon the coupler 172 remains in the fiber 169 and half of the light is then coupled into a fiber 174 and lost from the array. Light remaining in the fiber 169 after it passes through the coupler 172 is then incident upon a coupler 176 that couples part of the light into an optical fiber 178. The optical fiber 178 terminates in a mirror 180, which reflects the light back to the coupler 176 where part of the light is then cross-coupled back into the fiber 169 and then guided back to the coupler 172. Part of the light reflected from the mirror 180 is then cross-coupled in the coupler 172 into the fiber 174 for transmission to the compensating interferometer and subsequent processing as described above.

Light remaining in the fiber 169 after it passes through the coupler 176 is then incident upon a coil of optical fiber 182 formed between the coupler 176 and a coupler 184. The coupler 184 couples part of the light incident thereon from the coil 182 into an optical fiber 186 that terminates in a mirror 188. Light reflected from the mirror 188 is then guided back to the optical coupler 184, which couples part of the reflected light back into the optical fiber 169. The light reflected from the mirror 188 is then guided through the coil 182 to the coupler 176, which then transmits part of the light to the coupler 172. Light reflected from the mirror 188 that reaches the coupler 172 is then coupled into the fiber 174 as described above for light reflected from the mirror 180.

Light from the source 22 that remains in the optical fiber 169 after it passes through the coupler 184 passes through the fiber 169 to a coil 190, which is similar to the coil 182. Subsequent sensors in the system reflect signals back to the 3 dB coupler, which directs half of such signals toward the compensating interferometer 30. The fiber 169 terminates in a mirror 200 which reflects the light that remains in the fiber 169 after it is passed through a plurality of couplers 176, 184, 192 and 193 back toward the coupler 172. Thus light from the mirror 200 combines with light reflected from the mirrors 180, 188, 196 and 198 to produce interference patterns that may be processed to detect changes at the fibers 178, 186, 195 and 197 in a physical parameter being monitored.

The structures and methods disclosed herein illustrate the principles of the present invention. The invention may be embodied in other specific forms without departing from its spirit or essential characteristics. Therefore, described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A system of calibrating the sensor channels of a fiber optic sensor array that includes at least one fiber optic interferometric sensor, comprising:
   means for providing an optical carrier signal input to the fiber optic sensor array such that a portion of the optical carrier signal is input to each interferometric sensor in the array;
   compensating interferometer means for receiving optical signals output from the fiber optic sensor array;
   means for applying a calibration signal having a selected amplitude to the compensating interferometer to form an output signal that simulates signals output from each interferometric sensor in the array; and
   means for processing signals output from the compensating interferometer to determine the amplitude of the portion of the carrier signal that is output from each interferometric sensor in the fiber optic sensor array.

2. The system of claim 1 wherein means for applying a signal to the compensating interferometer includes means for modulating the phase of light in the compensating interferometer to produce signals that are a superposition of the signals output from the fiber optic sensor array and a modulating signal.

3. The system of claim 2 wherein the means for providing an optical signal input to each interferometric sensor in the array comprises:
   a laser diode;
   means for generating a pulse signal; and
   means for modulating light output from the laser diode with the pulse signal to form a pulsed light wave that is a time-gated optical signal.

4. The system of claim 3, further comprising:
   means for synchronizing application of the phase modulation signal to the compensating interferometer with the arrival of signals from the interferometric sensors;
   means for demultiplexing signals output from the compensating interferometer to correlate pulses in the signals with the interferometric sensors so that the scale factor of each interferometric sensor may be determined; and
   means for demodulating the outputs from the demultiplexing means.

5. The system of claim 1 wherein the compensating interferometer includes a fiber optic Mach-Zehnder interferometer connected to the fiber optic sensor array to receive signals output from each of the interferometric sensors in the array.

6. The system of claim 5 wherein the means for applying a signal to the compensating interferometer includes phase modulating means for modulating the phase of light in the compensating interferometer to produce signals that are a superposition of the signals output from the fiber optic sensor array and a modulating signal.

7. The system of claim 1 wherein the compensating interferometer includes a fiber optic Michelson interferometer connected to the fiber optic sensor array to receive signals output from each of the interferometric sensors in the array.

8. The system of claim 7 wherein the means for applying a signal to the compensating interferometer includes phase modulating means for modulating the phase of light in the compensating inteferometer to produce signals that are a superposition of the signals output from the fiber optic sensor array and a modulating signal.

9. The system of claim 1 wherein means for applying a signal to the compensating interferometer includes means for shifting the frequency of light in the compensating interferometer to produce signals that are a superposition of the signals output from the fiber optic sensor array and a frequency modulating signal.

10. The system of claim 9 wherein the means for providing an optical signal input to each interferometric sensor in the array comprises:
a laser diode;
means for generating a pulse signal; and
means for modulating light output from the laser diode with the pulse signal to form a pulsed light wave that is a time-gated optical signal.

11. The system of claim 10, further comprising:
means for synchronizing application of the frequency modulating signal to the compensating interferometer with the arrival of signals from the interferometric sensors;
means for demultiplexing signals output from the compensating interferometer to correlate pulses in the signals with the inteferometric sensors so that the scale factor of each interferometric sensor may be determined; and
means for demodulating the outputs from the demultiplexing means.

12. The system of claim 11 wherein the compensating interferometer includes a fiber optic Mach-Zehnder interferometer connected to the fiber optic array to receive signals output from each of the interferometric sensors in the array.

13. The system of claim 11 wherein the compensating interferometer includes a fiber optic Michelson interferometer connected to the fiber optic sensor array to receive signals output from each of the interferometric sensors in the array.

14. A method for calibrating the sensor channels of a fiber optic sensor array that includes at least one fiber optic interferometric sensor, comprising the steps of:
providing an optical carrier signal input to the fiber optic sensor array such that a portion of the optical carrier signal is input to each interferometric sensor in the array;
receiving optical signals output from the fiber optic sensor array with compensating interferometer means;
applying a calbration signal to the compensating interferometer means to form an output signal that simulates signals output from each interferometric sensor in the array; and
processing signals output from the compensating interferometer means to determine the amplitude of the portion of the carrier signal that is output from each interferometric sensor in the fiber optic sensor array.

15. The method of claim 14 wherein the step of applying a signal to the compensating interferometer means includes the step of modulating the phase of light in the compensating interferometer means to produce signals that are a superposition of the signals output from the fiber optic sensor array and a modulating signal.

16. The method of claim 15 wherein the step of providing an optical signal input to each interferometric sensor in the array comprises the steps of:
providing a laser diode;
generating a pulse signal; and
modulating light output from the laser diode with the pulse signal to form a pulsed light wave that is a time-gated optical signal.

17. The method of claim 16, further comprising the steps of:
sychronizing application of the phase modulation signal to the compensating interferometer means with the arrival of signals from the interferometric sensors;
demultiplexing signals output from the compensating interferometer to correlate pulses in the signals with the interferometric sensors so that the scale factor of each interferometric sensor may be determined; and
demodulating the outputs from the demultiplexing means.

18. The method of claim 14 including the step of forming the compensating interferometer means to include a fiber optic Mach-Zehnder interferometer connected to the fiber optic sensor array to receive signals output from each of the interferometric sensors in the array.

19. The method of claim 18 wherein the step of applying a signal to the compensating interferometer means includes modulating the phase of light in the compensating interferometer means to produce signals that are a superposition of the signals output from the fiber optic sensor array and a modulating signal.

20. The method of claim 14 including the step of forming the compensating interferometer means to include a fiber optic Michelson interferometer connected to the fiber optic sensor array to receive signals output from each of the interferometric sensors in the array.

21. The method claim 20 wherein the step of applying a signal to the compensating interferometer means includes modulating the phase of light in the compensating interferometer means to produce signals that are a superposition of the signals output from the fiber optic sensor array and a modulating signal.

22. The method of claim 14 wherein the step of applying a signal to the compensating interferometer means includes shifting the frequency of light in the compensating interferometer to produce signals that are a superposition of the signals output from the fiber optic sensor array and a frequency modulating signal.

23. The method of claim 22 wherein the step of providing an optical signal input to each interferometric sensor in the array comprises:
providing a laser diode;
generating a pulse signal; and
modulating light output from the laser diode with the pulse signal to form a pulsed light wave that is a time-gated optical signal.

24. The method of claim 23, further comprising the steps of:
synchronizing application of the frequency modulating signal to the compensating inteferometer means with the arrival of signals from the interferometric sensors;

demultiplexing signals output from the compensating interferometer means to correlate pulses in the signals with the interferometric sensors so that the scale factor of each interferometric sensor may be determined; and demodulating the outputs from the demultiplexing means.

25. The method of claim 24 including the step of forming the compensating interferometer means to include a fiber optic Mach-Zehnder interferometer connected to the fiber optic sensor array to receive signals output from each of the interferometric sensors in the array.

26. The method of claim 24 including the step of forming the compensating interferometer means to include a fiber optic Michelson interferometer connected to the fiber optic sensors array to receive signals output from each of the interferometric sensors in the array.

* * * * *